(12) United States Patent
Haenle et al.

(10) Patent No.: US 7,300,233 B2
(45) Date of Patent: Nov. 27, 2007

(54) SHAFT TOOL AND ASSOCIATED COOLANT/LUBRICANT FEEDING POINT

(75) Inventors: Peter Haenle, Inzigkofen (DE); Dieter Gsaenger, Bingen (DE)

(73) Assignee: Joerg Guehring, Albstadt (DE)

( * ) Notice: Subject to any disclaimer, the term of this patent is extended or adjusted under 35 U.S.C. 154(b) by 0 days.

(21) Appl. No.: 11/375,745

(22) Filed: Mar. 15, 2006

(65) Prior Publication Data

US 2006/0159529 A1    Jul. 20, 2006

Related U.S. Application Data

(63) Continuation of application No. PCT/EP2004/011576, filed on Oct. 14, 2004.

(30) Foreign Application Priority Data

Oct. 14, 2003    (DE) ............................... 103 47 755

(51) Int. Cl.
    *B23B 27/10* (2006.01)
    *B23B 51/06* (2006.01)
(52) U.S. Cl. ...................... 408/57; 408/56; 408/226
(58) Field of Classification Search .................. 408/58, 408/57, 59, 144, 226, 227, 230, 231, 233, 408/239 R, 239 A; 279/20
    See application file for complete search history.

(56) References Cited

U.S. PATENT DOCUMENTS

| 1,454,452 | A | * | 5/1923 | Moore ........................ 408/59 |
| 1,940,220 | A | * | 12/1933 | McGrath ..................... 408/59 |
| 3,216,107 | A | * | 11/1965 | Andreasson .................. 407/1 |
| 3,313,186 | A | * | 4/1967 | Rochon ..................... 76/108.1 |
| 3,460,410 | A | * | 8/1969 | Briles ........................ 408/57 |
| 3,791,660 | A | * | 2/1974 | Bostley ....................... 279/20 |
| 4,137,002 | A | * | 1/1979 | Barker et al. ................. 408/59 |
| 4,826,364 | A | * | 5/1989 | Grunsky ...................... 408/59 |
| 5,230,593 | A | * | 7/1993 | Imanaga et al. ............. 408/230 |
| 5,915,895 | A | * | 6/1999 | Jager et al. ................. 408/225 |
| 6,059,702 | A | * | 5/2000 | Winkler et al. ............... 483/13 |
| 6,305,696 | B1 | | 10/2001 | Sugata et al. |
| 6,582,167 | B1 | * | 6/2003 | Sugata et al. ............... 409/136 |
| 6,923,604 | B2 | * | 8/2005 | Sugata et al. ............... 409/136 |

(Continued)

FOREIGN PATENT DOCUMENTS

DE    33 14 349    10/1984

(Continued)

OTHER PUBLICATIONS

Peter Hänle and Dieter Gsänger, "MMS-gerechte Gestaltung des Bohrerschaftes", Sonderdruck aus der Fachzeitschrift Werkstatt und Betrieb Sep. 2003.

*Primary Examiner*—Willmon Fridie, Jr.
(74) *Attorney, Agent, or Firm*—Burr & Brown (57) ABSTRACT

A shaft tool with a machining section and a cylindrical shaft which comprises at least one internal coolant/lubricant duct which on its end facing away from the machining section comprises at least one orifice, wherein the shaft forms a conical fitting surface that encloses the orifice. A device comprising a shaft tool and a connection piece, the connection piece comprising a centric coolant/lubricant supply duct which exits in an apex region of an inner cone which accommodates in a positive-locking manner the conical fitting surface of the shaft tool, the conical fitting surface facing the inner cone.

23 Claims, 4 Drawing Sheets

U.S. PATENT DOCUMENTS

| | | | |
|---|---|---|---|
| 7,090,448 B2 * | 8/2006 | Stoll et al. | 409/136 |
| 2002/0094250 A1 * | 7/2002 | Voss | 409/234 |
| 2005/0275170 A1 * | 12/2005 | Haenle et al. | 279/20 |

FOREIGN PATENT DOCUMENTS

| | | |
|---|---|---|
| DE | 3709647 A1 * | 10/1988 |
| DE | 40 03 257 | 8/1991 |
| DE | 195 22 141 | 2/1996 |
| DE | 195 44 556 | 6/1997 |
| DE | 101 57 450 A1 | 6/2003 |
| DE | 101 57 450 B4 | 6/2003 |
| DE | 103 12 743 | 9/2004 |
| EP | 0 556 801 | 8/1993 |
| EP | 1 127 656 | 8/2001 |
| EP | 1 203 631 | 5/2002 |
| EP | 1 203 631 A1 | 5/2002 |
| EP | 1 316 387 | 6/2003 |
| JP | 63251106 A * | 10/1988 |

* cited by examiner

SHAFT TOOL AND ASSOCIATED COOLANT/LUBRICANT FEEDING POINT

This application is a Continuation of International Application PCT/EP2004/011576, filed Oct. 14, 2004, the entirety of which is incorporated herein by reference. This application claims the benefit of German Application No. DE 103 47 755.1, filed Oct. 14, 2003.

FIELD OF THE INVENTION

The invention generally relates to the design of a shaft tool, such as e.g. a drilling, milling, reaming, thread-forming or thread cutting tool, that comprises an internal coolant duct and is characterized in that while being economical to produce it is in a particularly effective way suitable for supplying the cutters with coolant/lubricant.

BACKGROUND OF THE INVENTION

As a rule, shaft tools of this type are supplied with coolant/lubricant to a coolant/lubricant feeding point, for example in the form of a connection piece comprising a central coolant/lubricant supply duct. Frequently, connection to a supply part of a minimal-quantity-lubrication system takes place within a chuck.

Minimal-quantity-lubrication technology, i.e. minimal quantity or reduced quantity lubrication, is increasingly gaining in importance, in particular in process technology using cutting tools. The basic principle of this technology is to deliver a lubricant mist (a type of aerosol) comprising a minimum quantity of lubricant and considerable excess air at a consistency and quality that are as even as possible, to the working cutters. Any fluctuations in quality, for example fluctuations caused by cyclical or spontaneous demixing in the aerosol that is supplied at pressure, can result in unforeseeable tool breakage, and consequently, as a result of interruption of the production, to considerable damage.

Figure 1:
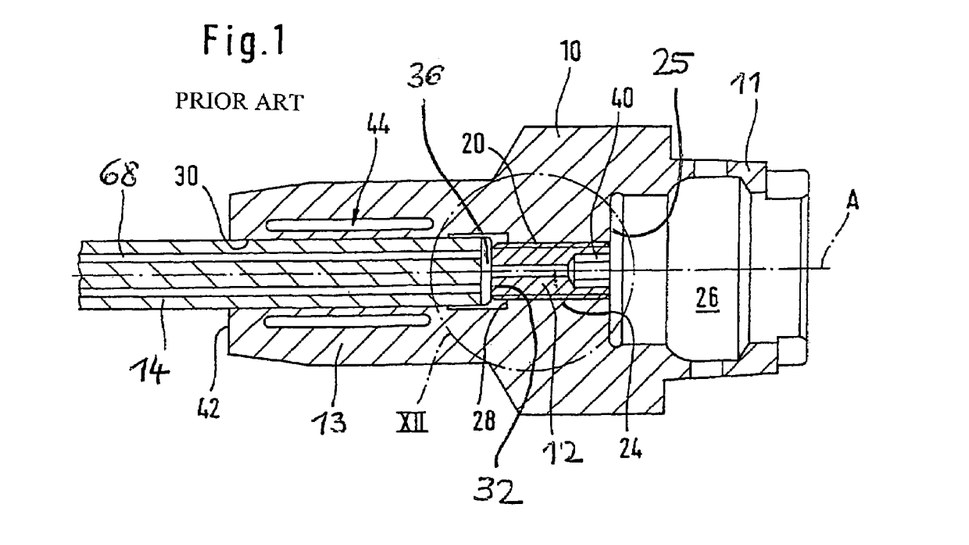
FIG. 1 is a sectional view of a known interface.

A known arrangement of such an interface is for example shown in FIG. 1, to which reference is already made at this stage.

In FIG. 1 reference character 10 designates a tool holding fixture which at one end comprises a hollow-shaft cone 11 for accommodation in a tool system module or in a machine tool spindle, and which tool holding fixture at the other end comprises a cylindrical chuck part 13 for the actual accommodation of a tool 14, which in the example shown is an internally-cooled drilling tool. However, it should already be pointed out that the tool can also be some other rotary driven tool, such as for example a milling tool or a fine boring tool. In order to supply the internal ducts, designated 68, with coolant and lubricant, the tool holding fixture 10 comprises a threaded borehole 20 into which an insert 12 in the form of a locking screw has been turned. The thread 20 extends concentrically in relation to the axis A, from a bottom surface 25 of the recess 26 of the hollow-shaft cone 11 to the base area 28 of the cylindrical borehole 30 for accommodating the tool 14.

With its face pointing towards the tool the insert 12 rests against a face 32 of the tool 14, which face 32 points away from the tool tip (not shown). A central borehole 24 extends along the entire length of the insert 12, wherein the diameter of said central borehole 24 is approximately equal in size to the width of a diametrically extending slit 36 in the abutting face 32 of the tool 14. The diametrical slit 36 is aligned in such a way that it extends over the orifices of the two internal ducts 68.

For axial setting of the insert 12, a hexagon socket recess 40 is provided on the end facing away from the tool 14. This ensures that when the locking screw 12 is adjusted, the limit stop for the face 32 of the tool 14 is adjusted as well so that the axial position of the tool cutter (not shown) in relation to a face 42 of the tool holding fixture 10 can be fine-adjusted.

In order to clamp the tool, for example first the adjusting screw 12 is screwed into the threaded borehole 20 to a specified desired dimension. Thereafter the tool 14 is inserted into the cylindrical borehole 30 until said tool comes to rest against the locking screw 12, and then the clamping device, which in the example shown is an expansion chuck 44, is activated. The diagram shows that when coolant/lubricant is fed by way of the module of a clamping system, which module accommodates the hollow-shaft cone, even supply of the coolant channels 68 takes place in that the coolant/lubricant enters by way of the hexagon socket recess 40, from where it flows by way of the borehole 24 to the slit 36 that is aligned flush with said borehole 24, from which slit 36 said coolant/lubricant flows radially outward to the orifices of the internal ducts 68.

It has been shown that this design cannot reliably ensure that the desired cooling or lubricating effect occurs in a satisfactory manner, in particular if the tool is operated using so-called minimal quantity lubrication. It has been shown in detail that in the case of minimal quantity lubrication the lubricant mist that has to be conveyed through the internal ducts does not arrive at the cutter at the desired even consistency.

In order to provide improved control over these problems, various efforts have been made. For example, in patent specification DE 101 57 450 A1, a concept has been proposed by which stabilization of the mixture takes place in that several large-angle deflections of the flows or partial flows are avoided, as a result of which uncontrolled demixing of the lubricant mist is effectively countered.

However, this known solution requires a comparatively complex geometry of the engaging connecting surfaces between the tool shaft and the feed part, as a result of which tool costs increase, all the more so since the tools are frequently made from particularly high-strength materials that are more difficult to machine.

BRIEF SUMMARY OF THE INVENTION

It is thus the object of the invention to create a shaft tool of the type described in the introduction, which tool is easier to manufacture and which can nevertheless form part of an effective interface for the coolant/lubricant feed into a tool. It is a further object of the invention to provide coolant/lubricant transfer for such a tool, wherein a configuration that can be produced economically ensures that the coolant/lubricant is fed through an insert and into the corresponding internal duct in the tool, of which duct there is at least one, with such infeed, to the greatest extent possible, being free of any significant loss of pressure, and with said coolant/lubricant thus being fed to the cutter at homogeneous quality.

In relation to the shaft tool, these criteria are provided by tools according to the present invention, and in relation to the coolant/lubricant transfer they are met by interfaces and the devices (such devices comprising a shaft tool and a connection piece) according to the present invention.

According to the invention, the end of the shaft tool facing away from the cutter is designed anew. While up to now this shaft end has been equipped with a flat face that is aligned perpendicularly to the axis, according to the invention, it is provided with a conical fitting surface which encompasses at least one orifice of at least one internal coolant duct. This provides the option of effectively increasing the contact surface and sealing surface to an adjacent component, such as for example to a lubricant feed piece, without noticeably increasing the cost of the process of producing the tool. Modern machine tools are in a position, without further ado, to produce the conical fitting surface in one work step and thus to produce it just as quickly and economically as is the case with a chamfer, which in the conventional design of flat faces had to be produced anyway, in particular if the tool is made from a hard material such as for example a hard metal, a ceramic material or a cermet material.

However, furthermore, the conical fitting surface provides a great additional advantage in that a significantly wider spectrum for designing the coolant/lubricant transfer to the tool results. In particular, when the tool comprises at least one eccentrically arranged internal coolant duct, the conical surface can be used for axial and radial guidance of the lubricant to the outlet of the coolant duct, which is advantageous, in particular when it is crucial in minimal-quantity-lubrication systems to guide the oil/air mixture homogeneously and without any undesirable demixing to the tool tip or to the cutter.

At this point, it should be stressed that the design of the tool in the region of the shaft end, on the one hand, and the design of the associated connection piece, on the other hand, each represents an independent invention in itself, for which invention protection is claimed separately.

Depending on the concrete geometric shape of the connection piece that is used for the feeding-in of coolant/lubricant, the conical form of the shaft end can be subjected to further processing steps in order to thereby improve, i.e. even out, flow guidance.

If the internal coolant duct, of which there is at least one, is offset in relation to the shaft axis, it can be advantageous if the tool is designed such that the orifice is located in the region of an associated frontal slit that is substantially radially aligned. The radially extending slit, which, in cases where an even number of internal coolant/lubricant ducts are provided that are diametrically offset in relation to each other, can be produced even more easily, namely as a through-slit that essentially extends diametrically, is very easy to manufacture. The connection piece for lubricant infeed can then be designed as a simple inner cone.

By specifying a corresponding tolerance between the outer cone of the shaft and the inner cone of the connection piece, a reliable, circumferentially closed sealing surface in the region of the largest diameter of the cone surface pairing can be achieved. Furthermore, it has been shown that with this design of the coolant/lubricant transfer, very favorable flow conditions can be obtained.

Due to the cone's contact surfaces, the coolant/lubricant transfer point can easily be sealed so that undesirable issue of coolant/lubricant for example into a clamping region of a tool chuck or into an internal KSK space is prevented. At the same time, handling of the connection between the tool and the coolant/lubricant transfer part is extremely simple, wherein extensive flow-technology trials have shown that the relatively simple geometric design is such that no uncontrolled lubricant media accumulation occurs in the region of the interface. The desired quantity of lubricant thus actually reaches the cutters at the required quality, wherein particularly economical production of the tool and of the other components of the lubricant feed interface is ensured.

Particularly advantageously, the invention can be used in those cases where the tool comprises several eccentric internal coolant ducts, which can be either straight or helical.

The slit(s) or the slit-like recess(es) can be in the shaft tool and/or in the connection piece.

Eddy formation in the region of the coolant/lubricant transfer can be suppressed particularly effectively if the slit comprises a rounded groove base. Furthermore, trials have shown that a wide slit tends to further suppress eddy formation so that this improvement is particularly suited to tools used in minimal-quantity-lubrication systems.

The simplified design, according to the invention, of the face of a tool, which face is opposite a lubricant supply part, preferably a minimal-quantity-lubrication supply part, is also well suited to being used with particularly high-strength materials for the cutting head or the tool. In particular, with the tool according to the invention, hard materials, in particular sintered materials including so-called cermet materials, can be used particularly economically. For, the recesses for the coolant/lubricant, which recesses are to be made, according to the invention, in the tool, can already be made in the sintered blank without there being any need for subsequent machining, in particular internal subsequent machining of the finished part, because in this regard there is no requirement to meet precise tolerances relating to dimensions, form and/or position.

In order to improve the cutting function and the service life, the cutting head of the tool can at least in part comprise a coating, preferably a hard-material coating. This can for example be a coating of diamond, preferably nanocrystalline diamond, of titanium nitride or of titanium aluminium nitride.

Furthermore, a sintered blank for the tool according to the invention is an independent subject of the invention, wherein the sintered blank comprises a conical shaft end so that final machining of the shaft or of the conical fitting surface to the desired dimensions can be limited to a minimum. These shaft components that are formed by sintered blanks can be obtained from the manufacturer as semifinished products. Advantageously, these form heads are purchased with overmeasure of a magnitude of only 0.5 mm in relation to the nominal diameter of the tool.

Further advantageous embodiments of the invention are also described herein.

Below, with reference to diagrammatic drawings, exemplary embodiments of the invention are explained in more detail.

BRIEF DESCRIPTION OF THE DRAWINGS FIGURES

The following are shown.

DETAILED DESCRIPTION OF THE INVENTION

Figure 2:
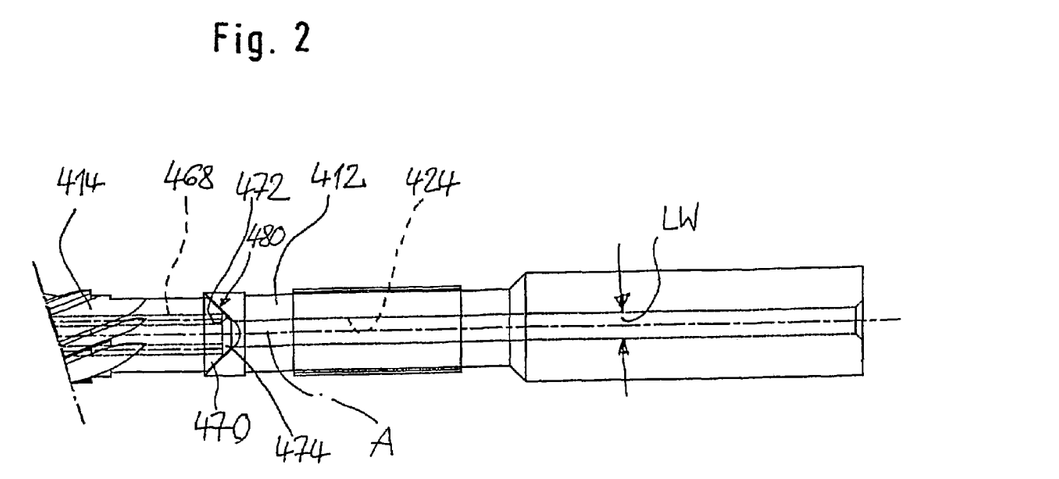
FIG. 2 is a diagrammatic lateral view of, for example, a rotary driven shaft tool, in particular of a drilling-finishing tool designed as a high-performance reamer, wherein the infeed of coolant/lubricant to internal coolant ducts takes place by way of a feed interface that interacts with a conical fitting surface of the tool shaft.

An embodiment of the invention, which embodiment is shown in FIG. 2, shows a design according to the invention of a shaft tool which advantageously can be used with a specially designed minimal-quantity-lubrication feed interface, which is shown by means of a connection between a first tool shaft part 412 and a second shaft part 414 which forms or carries the cutting part.

Feed-in of coolant/lubricant takes place from a central duct 424, arranged in the first shaft part 412, into eccentrically arranged internal coolant ducts 468 of the second shaft part 414. Two coolant ducts are provided that extend in a straight line in axial direction, which coolant ducts are situated on a common graduated circle so as to be diametrically offset from each other. However, it should already be pointed out at this stage that the coolant-lubricant infeed that will be described in more detail below is not limited to a particular type and design of the internal coolant ducts, which for example can also extend in a helical shape, for example in the lands of a helical drill, wherein they can also be distributed unevenly around the circumference and/or can be located on different graduated circles. The exit location of the internal coolant ducts can be selected according to individual requirements and will thus not be described in detail in this document. For this reason, the view of the cutting head 414 is diagrammatically cut off.

Connection to the first shaft part 412 of the shaft part that carries the cutting part 414 takes place by way of a cone surface pairing 480, wherein a conical lateral area or a truncated cone 470 of the shaft part, said conical lateral area or truncated cone 470 having been machined for a joining fit, is accommodated in a positive-locking manner, i.e. with a precise fit, in an inner cone 472 of the first shaft part 412. The central coolant/lubricant duct 424 leads to the base of said first shaft part 412.

In other words, the second shaft part 414, which carries the cutters, on the end facing away from the cutters comprises a conical fitting surface 470, 480 which encompasses or surrounds the orifices of the internal coolant ducts. In the embodiment shown, the feeding of the coolant lubricant into the internal ducts 468 furthermore takes place by way of a slit 474 on the face, which slit 474 includes the two orifices.

The slit 474 for example comprises a rounded slit base and is preferably of a width that matches the inner width LW of the coolant/lubricant supply duct 424 that comes from the connection piece, i.e. from the first shaft part 412.

The slit can for example be of essentially semicircular cross section. For sealing of the coolant/lubricant from the outside to be able to occur if required, the height of the truncated cone 470 exceeds the depth of the slit 474 in the region of its radial exit from the cutting part 414 so that radially outside the slit a positive-locking cone surface pairing between the truncated cone 470 of the cutter part and the inner cone of the connection piece 412 remains. The depth of the slit can also increase in a radial direction.

The feed, as shown in FIG. 2, of coolant/lubricant into the internal coolant ducts 468 is basically to be used to special advantage wherever it is a matter of placing coolant/lubricant, in particular with a small fraction of lubricant such as is used in the minimal-quantity-lubrication technique, from a connection piece with a central supply duct to an eccentric coolant duct in the tool, without there being any loss, and with good process reliability. An aspect of the present invention is therefore further directed to cover an object which is exclusively directed to this interface for coolant/lubricant transfer, and to the respective special design of the components involved therein.

Figure 3:
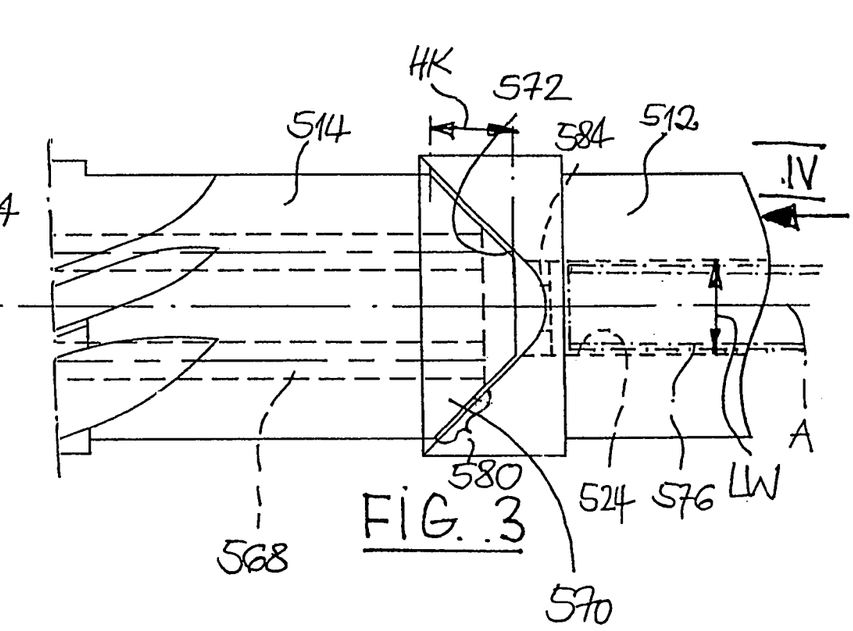
FIG. 3 is an enlarged partial view of the coolant/lubricant transfer interface in an embodiment according to FIG. 2.
Figure 4:
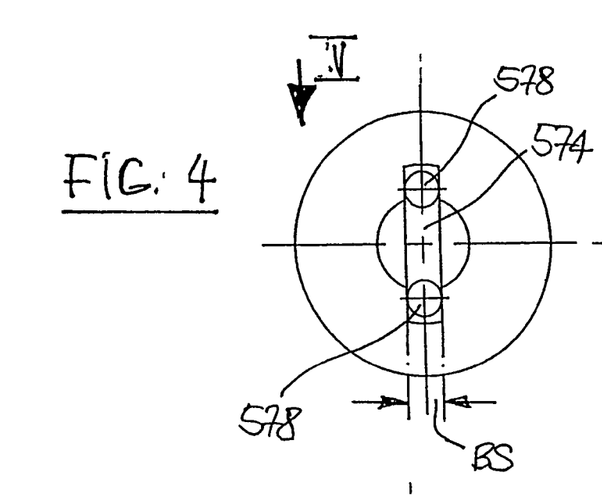
FIG. 4 is a view from the perspective "IV" of FIG. 3.
Figure 5:
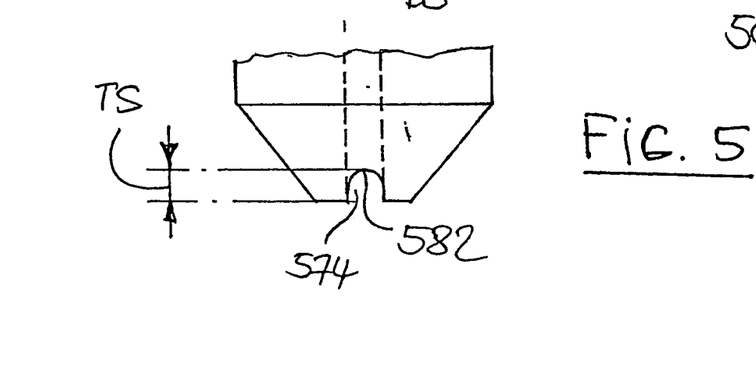
FIG. 5 is a view from the perspective "V" of FIG. 4.

In order to illustrate the particular aspects of this invention, reference is made to FIGS. 3 to 5, which show such an interface of coolant/lubricant transfer between a tool shaft 514 and a connection piece 512 that can for example consist of a so-called minimal-quantity-lubrication adjustment part, already described with reference to FIG. 1, for example an adjustment screw, which in its interior accommodates a minimal-quantity-lubrication tube 576 shown by a dot-dash line.

The shaft tool 514 comprises at least one coolant duct 568, which as a rule is eccentric and located on the inside; wherein said shaft tool 514 is to be clamped for example in a chuck (not shown in detail) such as for example a hydro expansion chuck or a shrink-fit chuck. On its side facing the connection piece 512, each internal coolant/lubricant duct 568 comprises an orifice 578 which in turn is enclosed (or encompassed) by a conical fitting surface 570. In other words, the shaft end of the tool is conical, wherein the cone has a precisely defined form at least in the region radially outside the orifice 578, which form provides a fitting surface for interaction with the connection piece.

Preferably the fitting surface is formed by a fine-machined surface. It can also continue in a region radially within the orifice 578.

Furthermore, in this embodiment, the orifices are in the region of an associated frontal, essentially radially aligned, slit 574.

Since the orifices 578 of the embodiment shown are diametrically offset in relation to each other, in this embodiment, a single diametrical slit suffices. The connection piece 512 again comprises a centric coolant/lubricant supply duct 524 that exits in the apex region of an inner cone 572. The inner cone 572 accommodates the facing end, i.e. the truncated cone 570, of the tool shaft 514 in a positive-locking manner and with a joining fit. For presentational reasons, in FIG. 3, the fitting gap is shown excessively large. In reality, the fitting surfaces closely rest against each other in such a way that radial sealing takes place. The facing cone surfaces preferably comprise such tolerances that the cone angle of the outer cone, i.e. the truncated cone 570, at any rate is no larger than the cone angle of the inner cone 572 so that, with cone surfaces that firmly rest against each other axially, contact in the radially outward region is ensured.

The connection piece 512 is preferably accommodated in the chuck so as to be axially adjustable.

For the transfer of the coolant/lubricant from the connection piece to the internal coolant ducts to be able to take place so as to ensure process reliability, i.e. so that there are no leaks and no fluctuations in the quality of the lubricant at the cutting face of the tool, the interface is designed as set out below.

First of all, the slit 574 comprises a rounded base 582. Preferably it additionally has a width which essentially corresponds to the inner width LW of the coolant/lubricant supply duct 524 that comes from the connection piece 512, or which width is narrower than said inner width. Trials have shown that eddy formation can be suppressed particularly effectively if the slit is essentially semicircular in cross section.

Because the shaft end 570 accommodated in the inner cone 572 of the connection piece 512 is in the shape of a truncated cone, and because the height HK of the truncated cone 570 exceeds the depth TS of the slit 574 in the region of its radial exit from the tool shaft 514, radially outside the slit there remains a positive-locking cone-surface pairing 580 between the truncated cone 570 of the tool 514 and the inner cone 572 of the connection piece 512, by way of which cone surface pairing reliable radial sealing of the interior space impinged on by coolant/lubricant takes place. In this arrangement, the form of the tool shaft end can be produced very economically.

By way of the shape of the slit 574, optimization of the supply flow can take place. Particularly good results have been achieved with a rounded but relatively wide slit which can be constant in depth.

As an alternative, the depth TS of the slit or of the duct delimited by the slit-like recess can also increase in a radial direction.

A host of different components can be used as a connection piece. When the coolant/lubricant transfer interface is designed so as to be located in a chuck, said connection piece is formed by an axially adjustable adapter, for example designed as a screw, which is essentially in the form of a stepped cylinder, wherein the section with the larger diameter forms the inner cone 572. On the end facing the tool, the adapter 512 can comprise a centric polygonal recess 584 of short axial extension.

In order to ensure a maximum stability, the tool, either entirely or preferably at least in the region of the cutting head, is made from a high-strength material, such as e.g. hard metal, high-speed steel such as HSS, HSSE or HSSEBM, ceramics, cermet or some other sintered material. Particularly preferred is the sintered material cermet, and in particular a cermet material with a fine-grained microstructure, good elevated-temperature hardness and good tenacity.

In order to additionally improve the processing quality, the cutting head, at least in the region of its sections most highly exposed to loads, i.e. in the region of the cutting edges and circular grinding chamfers, can comprise a coating which is preferably a hard-material coating. For example, diamond, preferably nanocrystalline diamond, can be considered for this hard-material layer, as can titanium nitride or titanium-aluminium nitride. Particularly suitable are, among other things, a titanium aluminium nitride coating and a so-called multilayer coating that is marketed by Messrs Gühring oHG under the designation "Fire I". This is a TiN-/(Ti, Al) N multilayer coating.

Particularly preferred is the use of an anti-wear coating, which essentially comprises nitrides with the metal components Cr, Ti and Al, and preferably with a small content of elements for grain refinement, wherein the Cr content is 30 to 65%, preferably 30 to 60%, particularly preferably 40 to 60%; the Al content is 15 to 35%, preferably 17 to 25%; and the Ti content 16 to 40%, preferably 16 to 35%, particularly preferably 24 to 35%; in each instance, in relation to all metal atoms in the entire coating. In this arrangement, the coating structure can be single-layered with a homogeneous mixing phase, or the coating structure can comprise several layers that are homogeneous in themselves, which alternately on the one hand comprise $(Ti_xAl_yY_z)N$, wherein x=0.38 to 0.5, and y=0.48 to 0.6, and z=0 to 0.04, and on the other hand comprise CrN, wherein preferably the uppermost layer of the anti-wear coating is formed by the CrN coating.

The part 414 that carries the cutters, of the embodiment shown, can also comprise a hard material, in particular a sintered material, such as for example a hard metal or a cermet material. If reamers are used, in particular the criteria of abrasion wear and elevated-temperature hardness are of decisive importance. It has been shown that the cermet brand "HTX", which is distributed by Messrs Kennametal-Hertel, can be used particularly advantageously. Furthermore, good results have been achieved with the brands "SC30" by the manufacturer Cerasiv GmbH (Feldmühle), and "Tungaly NS530" by Toshiba Europa GmbH.

Figure 6:
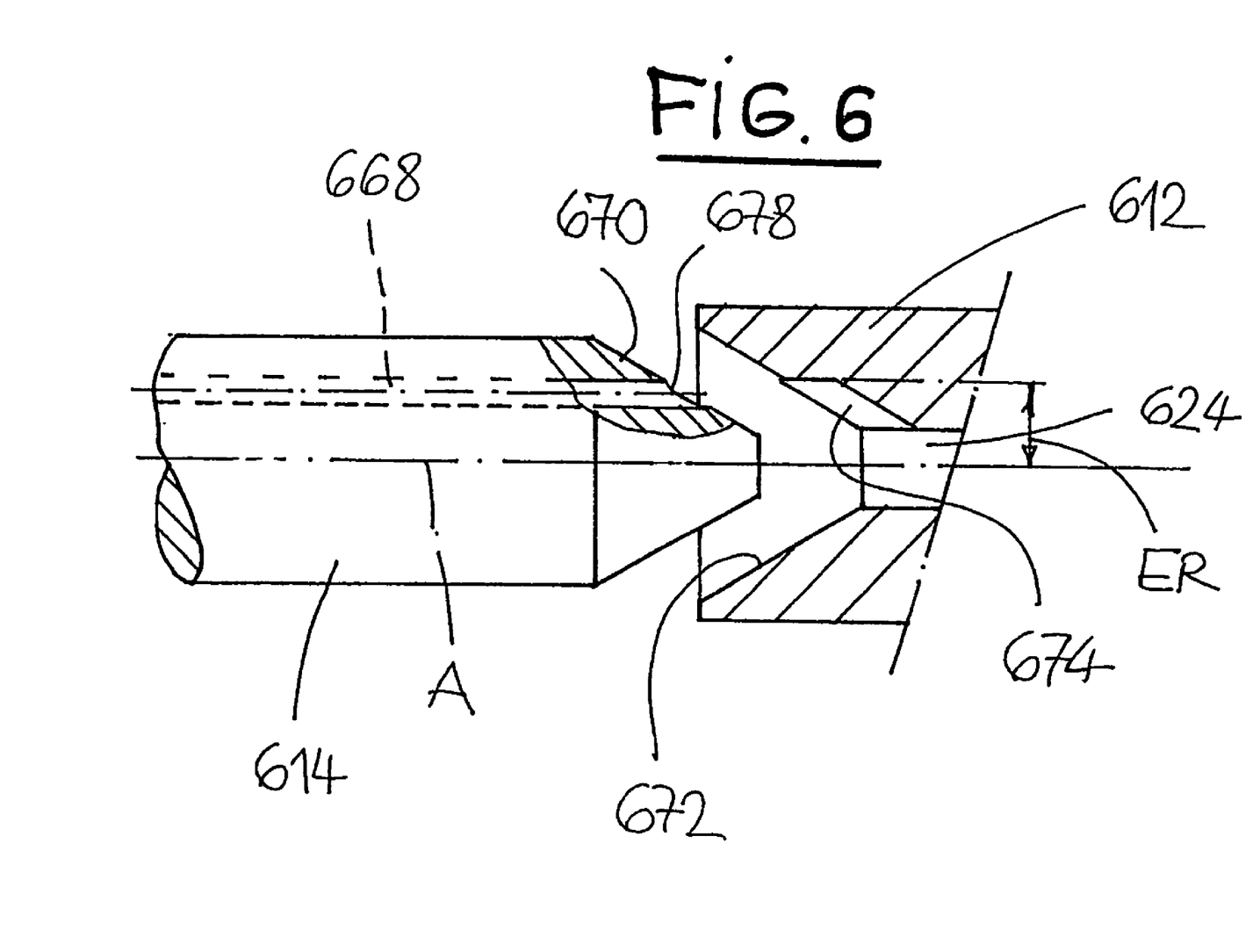
FIG. 6 is a modified embodiment of a coolant/lubricant transfer interface.

With reference to FIG. 6, a further variant of the shaft tool and of the coolant/lubricant feed is described. In this arrangement, too, components which correspond to the components of the previously described embodiments have corresponding reference characters, except that they are prefixed by the number "6".

In agreement with the previously described embodiments, the shaft 614, which for example comprises only one eccentrically located coolant/lubricant duct 668, comprises a conically tapering end with a cone fitting surface 670 which encloses the orifice 678 of the coolant/lubricant duct 668. However, the cone fitting surface 670 extends right through, i.e. it is not interrupted by a slit.

As a complement to the conical end of the shaft 614, the connection piece 612 comprises an inner cone 672 into which the centric coolant/lubricant duct 624 opens. To ensure that with the parts joined, i.e. with the fitting surface 670 abutting against the inner cone 672, a flow means connection between the centric internal duct 624 and the internal coolant/lubricant duct 668 is established, the connection piece 612 comprises a radially extending slit-like recess 674 whose radial extension ER is sufficient for it to reach, i.e. cover, the orifice 678. In this arrangement the form of the slit base can be identical to that in the embodiment according to FIGS. 3 to 5.

Figure 7:
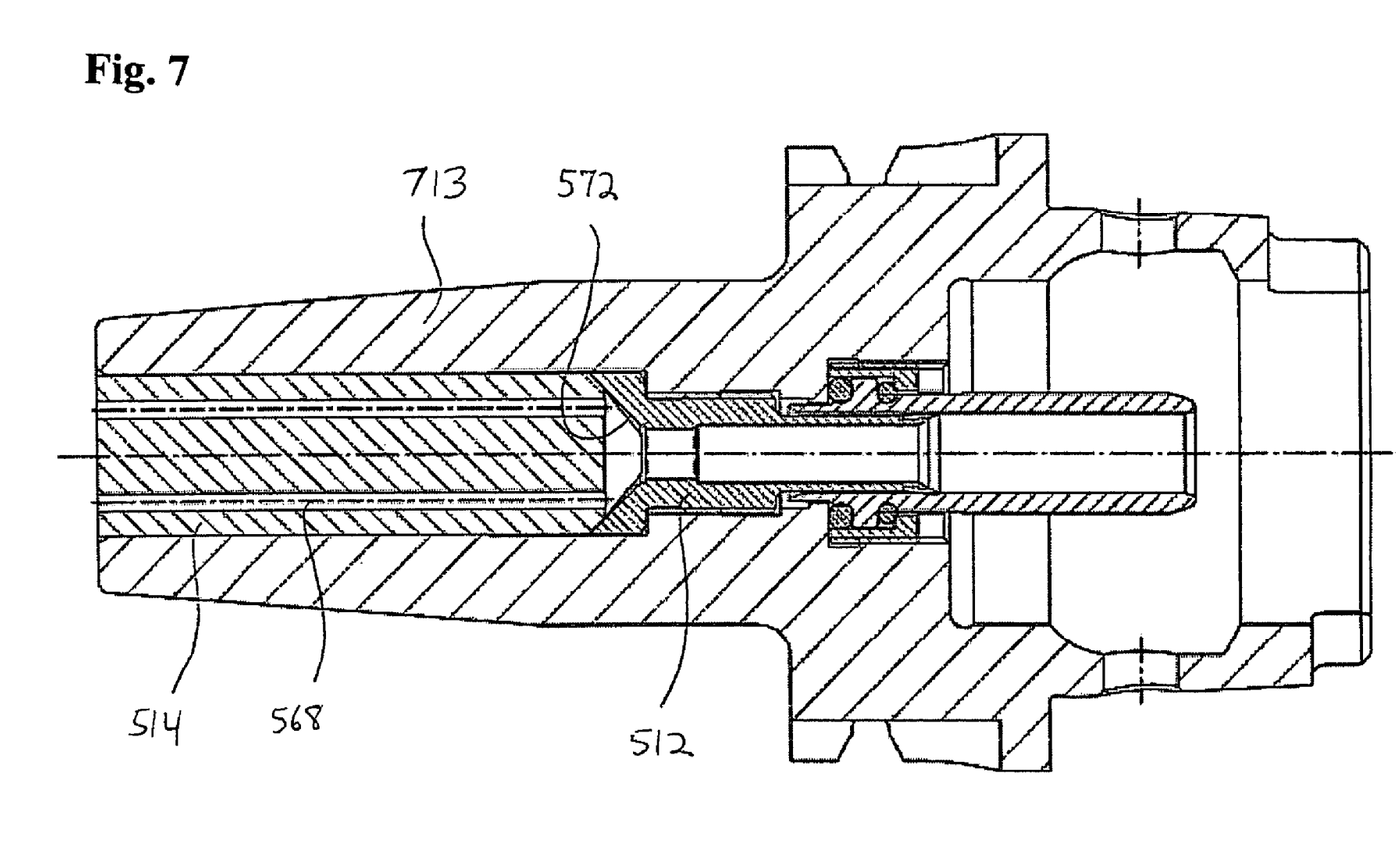
FIG. 7 is a view of a device according to the present invention, the device comprising a shaft tool and a connection piece.

FIG. 7 illustrates a device according to the present invention which further includes a chuck 713. The other reference numbers in FIG. 7 correspond to reference numbers used in FIG. 3 to refer to corresponding analogous structures depicted in FIG. 3.

Of course, deviations from the above-described variants of the tool are possible without leaving the basic idea of the invention.

For example, in the variant according to FIG. 6 it is possible, also or in addition, for the shaft to comprise a slit-like indentation.

The geometry for the coupling between the tool and the minimal-quantity-lubrication supply part can be subjected to variation according to size and cone angle. Of course, even in the case of cone surface pairing, in addition, a positive-locking connection such as for example an area indentation can be used.

The coolant duct in the shaft can of course also be arranged centrally. Furthermore, the diameter of the central coolant duct in the connection piece can be sufficiently large for it to cover the coolant/lubricant duct, of which there is at least one, in the shaft, or, as an alternative, branching of the flow into branch ducts can take place already in the connection piece, wherein said branch ducts lead into the coolant/lubricant duct in the shaft so as to be flush.

There is no need for the recesses in the tool to be made prior to the sintering process. It is also possible to make the recesses, either to final dimensions or in principle after the sintering process, in the tool or in the cutting head, which takes place preferably.

Similarly, the scope of the invention is not limited to rotary-driven tools such as for example high-performance reamers. Other shaft tools, either driven or non-driven, can also be equipped correspondingly, such as for example tapping tools or milling tools or other reamers with or without twist, wherein these tools can also be used as stationary tools, for example in boring equipment or lathes.

Of course, any commonly used means can be used as coolants/lubricants. There is no need for a limitation to minimal-quantity-lubrication means. Instead, so-called "wet" lubrication can be used, i.e. lubricant emulsions or oils and their mixtures.

The recess in the shaft and/or in the connection piece for producing the flow means connection from the connection piece to the coolant duct in the tool shaft is shown as a slit in the embodiments. However, the shape of this recess can be varied within wide boundaries. For example, the recess can be in the shape of a circular spherical cap, i.e. a concentric indentation in the shaft end, comprising a concave internal surface, such as for example the surface of a spherical segment between two parallel circles.

The invention thus provides a shaft tool that is particularly suitable for coupling to an interface for a coolant/lubricant feeding point, especially the type used in minimal quantity lubrication. The shaft tool according to the invention comprises at least one generally eccentric and internal coolant duct that is provided with an orifice on the end facing away from a machining section. Said orifice is surrounded by a conical fitting surface via which the shaft can be connected, e.g. within a chuck, to a coaxially disposed supply part providing minimal quantity lubrication.

According to the invention, simple fitting surfaces, namely cone surfaces, are used, wherein the inner cone surface, which is more difficult to produce, is made on the minimal-quantity-lubrication supply part, i.e. in a part that as a rule is easier to machine.

The invention claimed is:

1. A shaft tool with a machining section and a cylindrical shaft, the shaft comprising:
   at least one internal coolant/lubricant duct having an end facing away from the machining section, said end comprising at least one orifice;
   a conical fitting surface formed by a lateral area of a truncated cone, the conical fitting surface enclosing the orifice; and
   a radially aligned slit communicating with the orifice and having a radial exit from the shaft in the truncated cone, wherein a height of the truncated cone exceeds a depth of the slit in the region of the radial exit.

2. The shaft tool of claim 1, wherein the orifice is outside an axis of the shaft.

3. The shaft tool of claim 1, wherein the slit comprises a rounded base.

4. The shaft tool of claim 1, wherein the slit is of a width that is substantially equal to or smaller than an inner width of the coolant/lubricant duct.

5. The shaft tool of claim 1, wherein the slit is of substantially semicircular cross section.

6. The shaft tool of claim 1, wherein a depth of the slit increases in a radial direction.

7. The shaft tool of claim 1, wherein the internal coolant/lubricant duct extends in a helical shape.

8. The shaft tool of claim 1, wherein the shaft tool comprises a hard material.

9. The shaft tool of claim 8, wherein the shaft tool comprises a sintered material.

10. The shaft tool of claim 8, wherein the shaft tool comprises a cermet material.

11. A device comprising a shaft tool as recited in claim 1 and a connection piece, the connection piece comprising a centric coolant/lubricant supply duct which exits in an apex region of an inner cone which accommodates in a positive-locking manner the conical fitting surface of the shaft tool, the conical fitting surface facing the inner cone.

12. The device of claim 11, wherein the shaft tool is accommodated in a chuck.

13. The device of claim 12, wherein the chuck is a hydro expansion chuck.

14. The device of claim 12, wherein the chuck is a shrink-fit chuck.

15. The device of claim 11, wherein an end of the shaft tool that is accommodated in the inner cone of the connection piece is the truncated cone.

16. The device of claim 12, wherein the connection piece comprises an axially adjustable adapter that is accommodated in the chuck.

17. The device of claim 11, wherein the slit, which communicates with the orifice in the tool shaft, comprises a rounded base.

18. The device of claim 17, wherein the slit is of a width that is substantially equal to or less than an inner width of the coolant/lubricant duct.

19. The device of claim 17, wherein the slit is of substantially semicircular cross section.

20. The device of claim 17, wherein a depth of the slit increases in a radial direction.

21. The device of claim 16, wherein the adapter is formed by a screw, which is substantially in the form of a stepped cylinder, wherein a section with a larger diameter forms the inner cone.

22. The device of claim 21, wherein on an end facing the shaft tool, the adapter comprises a centric polygonal recess extending at least axially.

23. A shaft tool with a machining section and a cylindrical shaft, the shaft comprising:
   at least two internal coolant/lubrication ducts, each having an end facing away from the machining section, said end comprising at least one orifice;
   a conical fitting surface formed by a lateral area of a truncated cone;
   a coolant supply surface encompassing said orifices, said surface having a cross section that increases depth in a radial direction from a radial exit of the surface from the shaft to a lowest point approximate a longitudinal axis of the shaft,
   wherein a height of the truncated cone exceeds a depth of the coolant supply surface at the radial exit.

* * * * *

(12) EX PARTE REEXAMINATION CERTIFICATE (8317th)
United States Patent
Haenle et al.

(10) Number: US 7,300,233 C1
(45) Certificate Issued: Jun. 7, 2011

(54) SHAFT TOOL AND ASSOCIATED COOLANT/LUBRICANT FEEDING POINT

(75) Inventors: Peter Haenle, Inzigkofen (DE); Dieter Gsaenger, Bingen (DE)

(73) Assignee: Joerg Guehring, Albstadt (DE)

Reexamination Request:
No. 90/011,153, Aug. 11, 2010

Reexamination Certificate for:
Patent No.: 7,300,233
Issued: Nov. 27, 2007
Appl. No.: 11/375,745
Filed: Mar. 15, 2006

Related U.S. Application Data

(63) Continuation of application No. PCT/EP04/11576, filed on Oct. 14, 2004.

(30) Foreign Application Priority Data
Oct. 14, 2003  (DE) .......................................... 103 47 755

(51) Int. Cl.
| B23B 27/10 | (2006.01) |
| B23B 51/06 | (2006.01) |
| B23B 31/117 | (2006.01) |

(52) U.S. Cl. .............................. 408/57; 408/56; 408/226
(58) Field of Classification Search ...................... 408/59
See application file for complete search history.

(56) References Cited

FOREIGN PATENT DOCUMENTS

JP        10-296517        11/1998

*Primary Examiner* — Aaron J. Lewis (57) ABSTRACT

A shaft tool with a machining section and a cylindrical shaft which comprises at least one internal coolant/lubricant duct which on its end facing away from the machining section comprises at least one orifice, wherein the shaft forms a conical fitting surface that encloses the orifice. A device comprising a shaft tool and a connection piece, the connection piece comprising a centric coolant/lubricant supply duct which exits in an apex region of an inner cone which accommodates in a positive-locking manner the conical fitting surface of the shaft tool, the conical fitting surface facing the inner cone.

EX PARTE
REEXAMINATION CERTIFICATE
ISSUED UNDER 35 U.S.C. 307

THE PATENT IS HEREBY AMENDED AS
INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1, 15, 17-20 and 23 are cancelled.

Claims 2-11 are determined to be patentable as amended.

Claims 12-14, 16 and 21-22, dependent on an amended claim, are determined to be patentable.

2. The [shaft tool] *device* of claim [1] *11*, wherein the orifice is outside an axis of the shaft.

3. The [shaft tool] *device* of claim [1] *11*, wherein the slit comprises a rounded base.

4. The [shaft tool] *device* of claim [1] *11*, wherein the slit is of a width that is substantially equal to or smaller than an inner width of the coolant/lubricant duct.

5. The [shaft tool] *device* of claim [1] *11*, wherein the slit is of substantially semicircular cross section.

6. The [shaft tool] *device* of claim [1] *11*, wherein a depth of the slit increases in a radial direction.

7. The [shaft tool] *device* of claim [1] *11*, wherein the internal coolant/lubricant duct extends in a helical shape.

8. The [shaft tool] *device* of claim [1] *11*, wherein the shaft tool comprises a hard material.

9. The [shaft tool] *device* of claim 8, wherein the shaft tool comprises a sintered material.

10. The [shaft tool] *device* of claim 8, wherein the shaft tool comprises a cermet material.

11. *A device comprising:*
   *a shaft tool [as recited in claim 1]; and*
   *a connection piece,*
   *the shaft tool comprising a machining section and a cylindrical shaft, the shaft comprising:*
      *at least one internal coolant/lubricant duct having an end facing away from the machining section, said end comprising at least one orifice;*
      *a conical fitting surface formed by a lateral area of a truncated cone, the conical fitting surface enclosing the orifice; and*
      *a radially aligned slit communicating with the orifice and having a radial exit from the shaft in the truncated cone,*
   *wherein a height of the truncated cone exceeds a depth of the slit in the region of the radial exit,*
   the connection piece comprising a centric coolant/lubricant supply duct which exits in an apex region of an inner cone which accommodates in a positive-locking manner the conical fitting surface of the shaft tool, the conical fitting surfce facing the inner cone,
   *wherein there is a gap between the truncated cone and the inner cone, and the size of the gap decreases in a direction extending away from the apex region of the inner cone.*

\* \* \* \* \*